F. L. WILLIAMS.
DUMP BODY FOR VEHICLES.
APPLICATION FILED JULY 6, 1920.
1,363,945.
Patented Dec. 28, 1920.
2 SHEETS—SHEET 1.
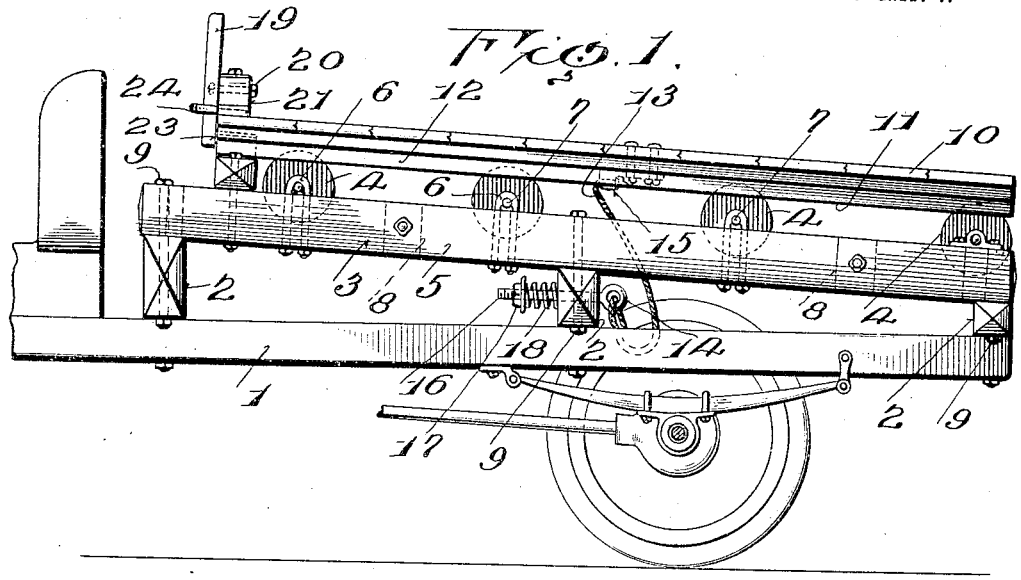
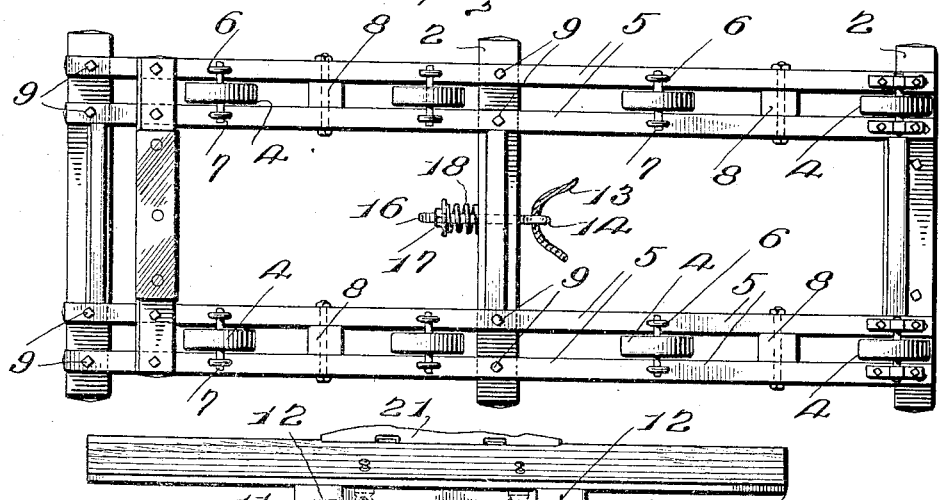
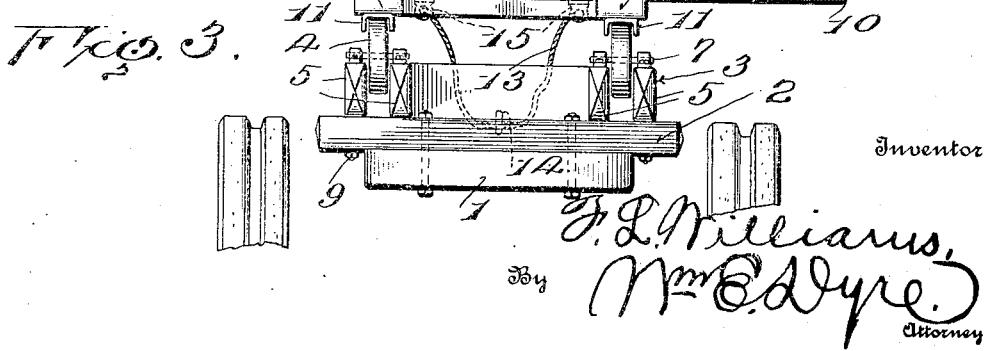
Inventor
F. L. Williams,
By Wm. E. Dype.
Attorney F. L. WILLIAMS.
DUMP BODY FOR VEHICLES.
APPLICATION FILED JULY 6, 1920.
1,363,945.
Patented Dec. 28, 1920.
2 SHEETS—SHEET 2.
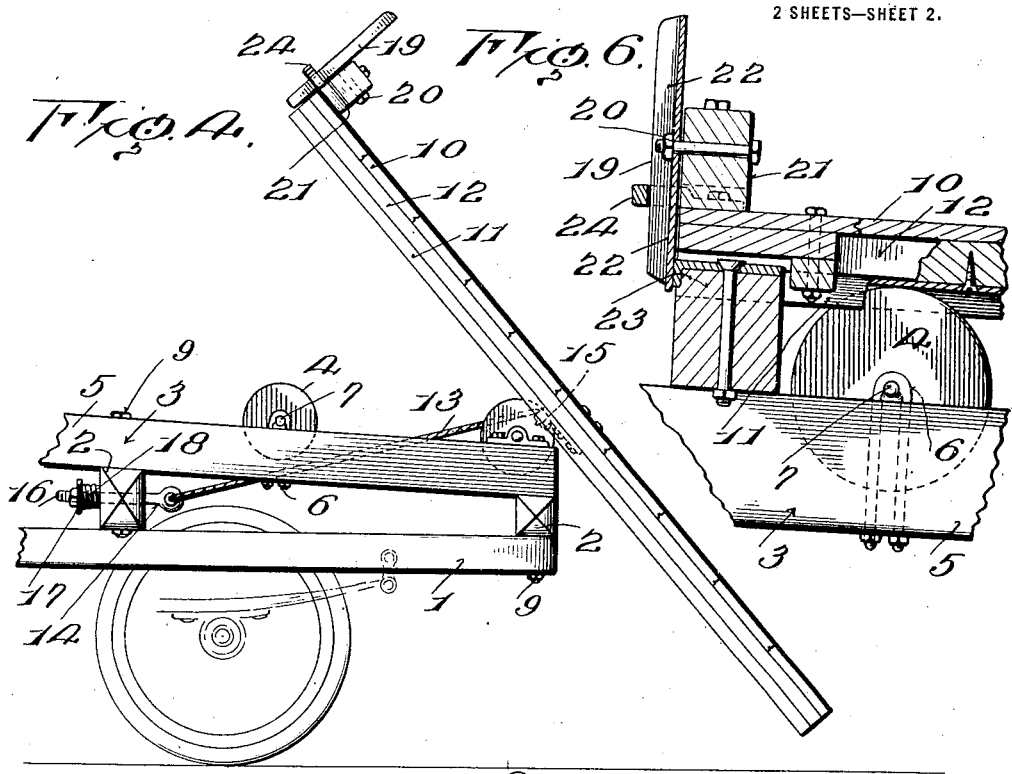
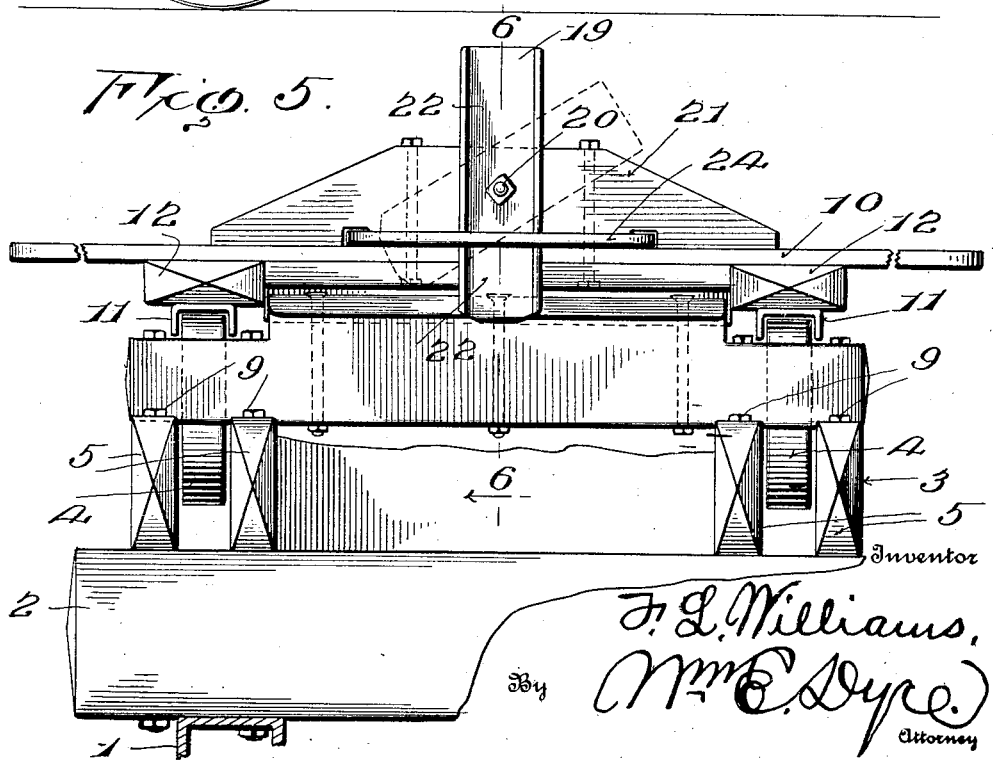

UNITED STATES PATENT OFFICE.

FRANK L. WILLIAMS, OF CUTHBERT, GEORGIA.

DUMP-BODY FOR VEHICLES.

1,363,945.  Specification of Letters Patent.  Patented Dec. 28, 1920.

Application filed July 6, 1920. Serial No. 394,152.

*To all whom it may concern:*

Be it known that I, FRANK L. WILLIAMS, a citizen of the United States, residing at Cuthbert, in the county of Randolph and State of Georgia, have invented certain new and useful Improvements in Dump-Bodies for Vehicles; and I do hereby declare the following to be a full, clear, and exact description of the invention, such as will enable others skilled in the art to which it appertains to make and use the same.

My invention relates to dump bodies for vehicles and more particularly motor trucks.

An object of the invention is to produce a dump body including a movable load supporting platform, means for slidingly mounting the platform upon an incline with as little friction as possible, means for yieldingly stopping the movement of the platform, thereby causing it to tilt and dump, and means for maintaining the platform in normal load carrying position, said last mentioned means including a novel latch which can be easily released when it is desired to stop and dump the load, due to the inertia of the platform and its contents in moving forward upon its support when the truck is brought to a standstill.

Another object of the invention is to provide a strong and durable dumping body of comparatively simple construction, wherein material such as clay, sand, gravel and similar building products for example can be quickly delivered, and the truck rendered free to return for other loads, without requiring the operator to mechanically elevate and lower the body through expensive and complicated dumping mechanism.

With these and other objects in view the invention further consists in the combination and arrangement of the several parts hereinafter described and pointed out in the appended claims.

In the accompanying drawings wherein similar reference characters designate corresponding parts in the several views:

Figure 1 is a side elevation of a motor truck chassis with my invention applied thereto;

Fig. 2 is a plan view of the supporting frame upon which the load carrying platform is slidingly and tiltingly mounted;

Fig. 3 is a fragmentary transverse view looking toward the dumping end of the body;

Fig. 4 is a view showing the body in dumping position;

Fig. 5 is a front elevation of the body illustrating the novel form of platform retaining latch, showing in full lines the position thereof for maintaining the platform in load carrying position, and in dotted lines the position to which it is moved for releasing the platform and dumping the load; and Fig. 6 is a detail vertical sectional view through the forward portion of the dumping body and retaining latch.

The present invention embodies the utilization of the law of gravity wherein the loaded platform slidingly gravitates upon an incline and when overbalanced tilts to empty the contents, and also the principle of inertia wherein the loaded platform is caused to move up the inclined support due to the stopping of the vehicle, thereby permitting the release of the body and the dumping of its contents.

Generally stated my invention comprises a suitable form of load carrying body, an inclined supporting frame provided with a series of rollers upon which the body is mounted, means for guiding the body upon the rollers, a cable for limiting the sliding movement of the body, a spring coöperatively associated with the cable for absorbing the shock and assisting in the return of the platform, and a pivoted latch operatively controlled by the weight of the load and load carrying platform.

Referring to the drawings, my invention is shown as applied to a motor truck chassis 1, suitable bolsters 2 of varying height being interposed to properly incline the supporting frame 3.

The supporting frame 3 upon which the load carrying platform moves, is provided with a series of rollers 4 arranged between spaced parallel side bars 5 as shown. Suitable bearings in the form of U-bolts 6 are secured to the side bars 5, and serve to retain the ends of the shafts 7 carrying the rollers 4. It will be understood that other types of bearings may be used and I do not limit myself to the exact form shown.

The parallel side bars are held in spaced relation by means of blocks and bolts 8 and are secured to the bolsters by the bolts 9.

The load carrying platform 10 is slidingly mounted upon the rollers 4. Guide devices in the form of channel bars 11 are secured to the under side of the platform, and are designed to engage the rollers forming guide tracks as shown. The edges or flanges of the channels are normally out of contact with the faces of the rollers, but are designed to engage the rollers should the platform slide unevenly.

By this construction the platform is evenly guided in its movement upon the incline and when tilting as shown.

The channel bars 11 are preferably secured to relatively heavy sills 12 upon which the platform boards are secured. Various changes in this form of the construction may be resorted to in practice, as will be understood.

The means for limiting the downward gravitation of the platform 10 and producing the dumping or tilting operation, includes a cable 13 looped through a yielding connection 14 and having its free ends secured to the under side of the platform 10 as indicated at 15. The connection 14 comprises an eye bolt 16 slidingly positioned in an opening formed in the intermediate bolster 2. The end of the bolt is threaded and is designed to receive a nut and washer 17 between which and the side of the bolster is interposed a spring 18 as shown.

It will be seen that this yielding connection serves to absorb the shock incidental to the sudden stopping of the platform as it slides down the incline. In addition, the return of the platform is facilitated by the action of the compressed spring exerting a reverse pull upon the cable 13 as will be understood.

This construction together with the fact that the platform is substantially balanced renders the manual lifting of the platform by an operator comparatively easy.

The means for retaining the platform in load carrying position includes the latch 19 pivotally mounted at 20 upon a block 21 suitably bolted to the platform. The latch is shown herein as formed of a section of channel iron, and is provided with the wings 22, one of which is designed to engage the edge of a cross bar 23 carried by a supporting frame, and the other of which extends upwardly within easy reach of the operator. A suitable guard frame 24 is provided for the latch as shown.

In operation, the platform is normally held in load carrying position by the latch 19, as shown in Figs. 5 and 6. When the vehicle is brought to a stop the inertia of the load causes the platform 10 to move up the inclined supporting frame and sufficiently separate or release the wing of the latch engaging the cross bar, thereby rendering the latch free so that it can be easily swung into the position, as shown for example by dotted lines in Fig. 5. The platform now gravitates down the incline until stopped by the cable and yielding connection, whereupon it tilts and dumps the load as shown in Fig. 4.

The platform is returned to the supporting frame by an operator, who is assisted, however, by the yielding connection, the spring of which has been put under compression by the tilting operation. The relative balance of the platform also renders the return thereof comparatively easy, as will be understood. When moved up the incline the platform is secured by again swinging the latch into retaining position, and the truck is ready to receive another load.

Various changes in the construction and arrangement of the several parts may be resorted to and I do not limit myself to the exact showing set forth herein.

I claim:

1. A dumping body for vehicles including in combination an inclined supporting frame elevated at its forward end, a load-carrying platform slidably mounted upon said frame, and means for normally locking the latter in load-carrying position whereby upon retarding the speed of the vehicle inertia of the load will move said platform forwardly relative to the supporting frame thus permitting release of said locking means.

2. A dumping body for vehicles including in combination an inclined supporting frame elevated at its forward end, a load-carrying platform slidably mounted upon said frame, and means adjacent the driver's seat for normally locking said platform in load-carrying position whereby upon retarding the speed of the vehicle inertia of the load will move said platform forwardly relative to the supporting frame thus permitting release of said locking means.

In testimony whereof I affix my signature, in presence of two subscribing witnesses.

FRANK L. WILLIAMS.

Witnesses:
R. E. GORMLEY,
P. M. REID.